United States Patent [19]

Cheal

[11] 4,328,487

[45] May 4, 1982

[54] INTRUSION DETECTOR SYSTEM

[75] Inventor: James Cheal, Tempe, Ariz.

[73] Assignee: Southwest Microwave, Inc., Tempe, Ariz.

[21] Appl. No.: 172,944

[22] Filed: Jul. 28, 1980

[51] Int. Cl.³ .............................................. G05B 13/18

[52] U.S. Cl. .................................... 340/554; 333/237; 393/5 PD; 393/853

[58] Field of Search ............. 340/554; 343/5 PD, 810, 343/853, 854, 771; 333/237, 260

[56] References Cited

U.S. PATENT DOCUMENTS

| | | | |
|---|---|---|---|
| 2,147,746 | 2/1939 | Luck et al. | 315/378 |
| 2,234,234 | 3/1941 | Cork et al. | 343/791 |
| 2,490,238 | 12/1949 | Simons | 177/352 |
| 2,496,242 | 1/1950 | Bradley | 343/853 |
| 2,643,334 | 6/1953 | Aram | 343/853 |
| 3,031,643 | 4/1962 | Sheftelman | 343/5 PD |
| 3,100,879 | 8/1963 | Greunke | 331/135 |
| 3,237,105 | 2/1966 | Kalmus | 325/29 |
| 3,237,191 | 2/1966 | Bojko | 343/5 |
| 3,524,190 | 8/1970 | Killion et al. | 343/771 |
| 3,599,213 | 8/1971 | Fessender | 343/710 |
| 3,728,721 | 4/1973 | Lee et al. | 343/5 PD |
| 3,744,044 | 7/1973 | Vosteen | 340/213 |
| 3,754,254 | 8/1973 | Jinman | 343/7.7 |
| 3,760,400 | 9/1973 | Galvin et al. | 340/258 |
| 3,803,539 | 4/1974 | McMaster | 340/1 R |
| 3,813,479 | 5/1974 | Olivero | 333/260 |
| 3,845,461 | 10/1974 | Foreman | 340/1 R |
| 3,886,549 | 5/1975 | Cheal et al. | 343/7.7 |
| 3,922,660 | 11/1975 | Galvin | 340/258 |
| 3,947,834 | 3/1976 | Gershberg et al. | 340/554 |
| 3,956,743 | 5/1976 | Geiszler et al. | 340/258 C |
| 4,012,730 | 3/1977 | Nicralls | 340/258 |
| 4,064,499 | 12/1977 | Geiszler et al. | 340/258 C |
| 4,087,814 | 5/1978 | Spirig | 343/5 PD |
| 4,091,367 | 5/1978 | Harman | 343/5 PD |
| 4,187,501 | 2/1980 | Olesch et al. | 340/554 |
| 4,213,123 | 7/1980 | Poirier | 343/5 PD |

OTHER PUBLICATIONS

"Guidar", Computing Devices Company, Control Data.

*Primary Examiner*—Glen R. Swann, III
*Attorney, Agent, or Firm*—Joseph H. Roediger; Victor Myer; Charles E. Cates

[57] ABSTRACT

An intrusion detection system includes a transmitter of wave energy at one end of a transmission line or coaxial cable, for example, and a receiver connected directly to the transmission line or a cable at the other end together with a series or discrete antennas uniformly spaced along the transmission line and relatively loosely coupled thereto. The coupling between the antennas and the transmission line or coaxial cable is determined to be of an optimum value and in such a system the sensitivity to an intrusion is the same along the length of the coaxial cable or transmission line for the same distance from the transmission line.

10 Claims, 10 Drawing Figures

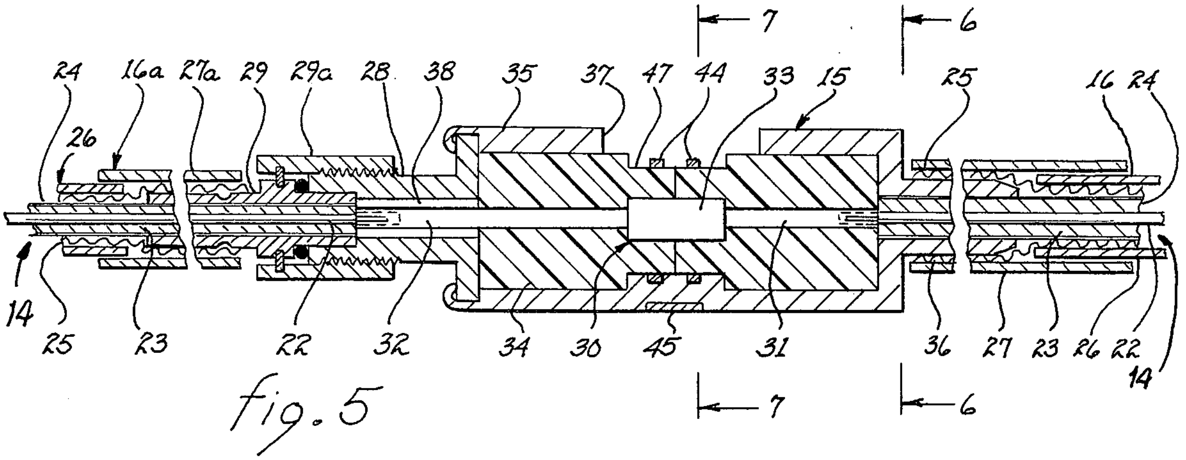
fig. 5
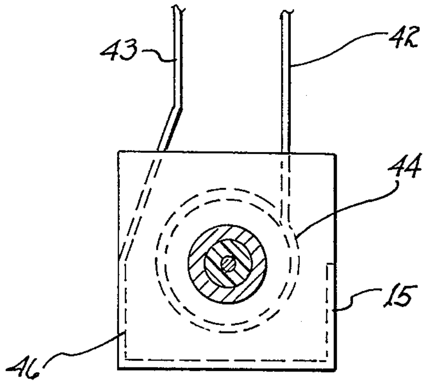
fig. 6
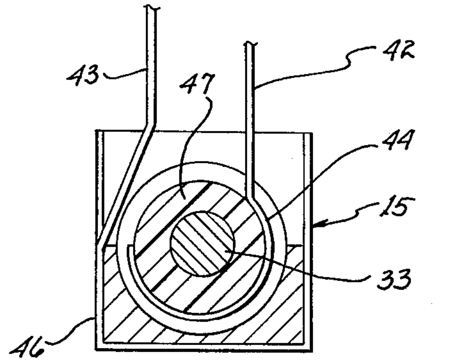
fig. 7
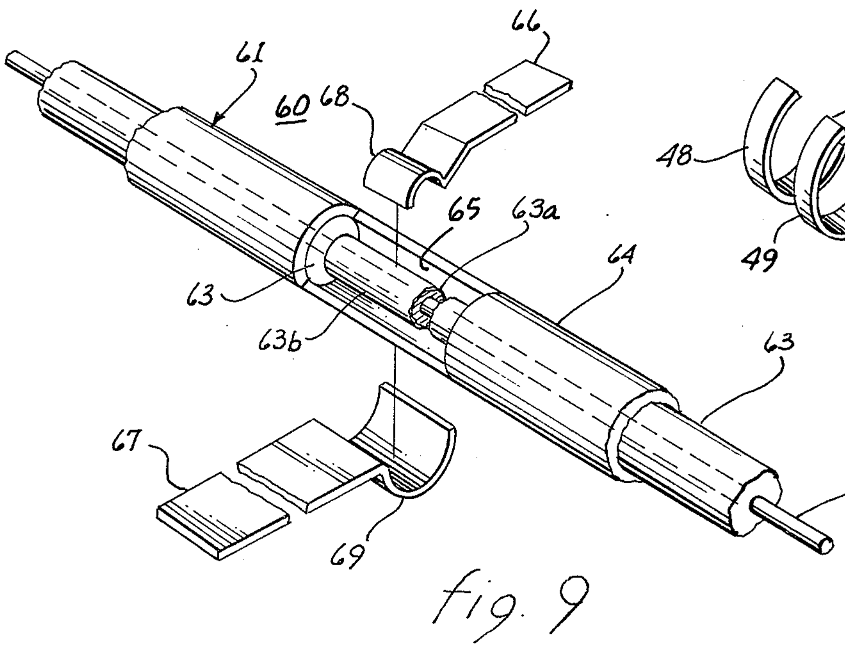
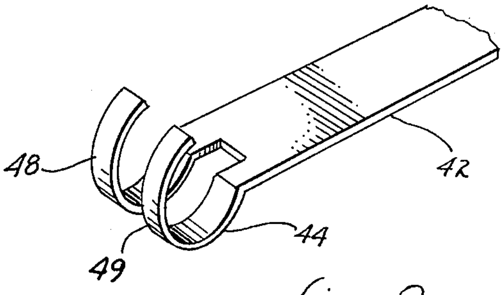
fig. 8
fig. 9

INTRUSION DETECTOR SYSTEM

CROSS REFERENCE TO RELATED APPLICATION

The subject application is related to the application entitled "Coupling Unit For Coaxial Cable Including Means For Radiating Wave Energy" Ser. No. 06/173,009, filed July 28, 1980, in the names of the inventors, James Cheal and Vincent J. McHenry and assigned to the same assignee as the subject invention.

BACKGROUND OF THE INVENTION

This invention relates to an RF, or microwave, intrusion detection system, and more particularly to such a system wherein the sensing element may follow the terrain into which it is disposed irrespective of its contours, and it is an object of the invention to provide an improved intrusion detection system of this nature.

Intrusion detection systems frequently are intended for use as perimeter surveillance systems in connection with a fence or wall that surrounds the area to be protected. The idea is that some intruder coming within a specified distance of the boundary provided by the perimeter will cause an alarm to be sounded at an appropriate central location.

Several types of equipment for this purpose are presently available. These comprise seismic or vibration sensors mounted on a fence or in a buried cable, microwave links which alarm when the beam is interrupted between a transmitter and a receiver and low frequency electric field detector schemes which sense changes in the electric field between two or more parallel wires, the electric field in the latter instance being generated at low frequency and being essentially non-radiating. A more recent development also designed for perimeter surveillance may be referred to as a guided radar. In this system a pair of slotted coaxial cables separated by five to six feet are laid around the perimeter of the area to be protected. A pulse VHF transmitter is connected to one cable and a receiver is connected to the other cable. The remote ends of the two cables are terminated in appropriate characteristic impedances. A moving object between the two cables will change the received power, and the distance to the disturbance from the transmitter and receiver can be measured with a resolution compatible with the pulse width.

While all of the above systems are being used, they also have limitations that prevent or limit their use in specific applications. The vibration sensors have false alarm rates that are too high and do not detect intrusions that vault the fence. Microwave links are line of sight devices and are not suitable for rough, uneven topography or for very narrow corridors. The electric field sensor is plagued with high maintenance costs and is susceptible to lightning and interference from power lines. The leaky cable guided radar overcomes many of the indicated limitations, but it is very expensive, has little flexibility in changing the detection zone, and requires specially designed cable to equalize the sensitivity as a function of distance from the sensor.

It is a further object of the present invention to provide a low-cost, terrain following perimeter intrusion detection system compatible with other types of sensors such as microwave links and with few of the limitations characteristic of the known systems. More particularly it is an object of the invention to provide such a system wherein the sensitivity to the presence of an intruder is the same irrespective of whether the intruder is adjacent to the transmitter or remote therefrom so long as he is at the same distance from the sensing element.

In a preferred form of the invention the receiver may be of the doppler type for improved operation.

SUMMARY OF THE INVENTION

Briefly, the invention may be characterized as an intrusion detection system comprising the components of an RF, or wave, generator of the appropriate frequency, i.e., a transmitter, for operating at the indicated frequencies and a long transmission line feeding a series of radiating elements connected between the transmitter and the receiver. The radiating elements which may be discrete antennas of the dipole type, or in some forms may be slots in a cable or, for that matter, an ordinary leaky cable or unshielded twin lead, for example, all of which result in a radiation pattern uniformly coupled along the length of the transmission line or cable. The radar detection law of received power being proportional to $1/R^4$ for distances (R) measured perpendicular to the transmission line will apply in all instances. In the preferred form of the invention the radiation elements are relatively widely spaced along the transmission line, for example, ten wave lengths, or more, and are relatively loosely coupled to the transmission line, or cable.

Inasmuch as the receiver terminates the transmission line, all signals traveling down the transmission line including the initial signal from the transmitter and any doppler reflected signal from an intruder are attenuated at the same rate. An intruder signal from adjacent to the transmitter travels a relatively long distance down the transmission line to the receiver and has a certain value when received thereat, whereas a signal from an intruder relatively close to the receiver, while generating a relatively weaker intrusion signal, has a much shorter distance to go before reaching the receiver because the length of transmission line between the intrusion and the receiver is short. Thus, it is evident, that for equal distances perpendicular to the length of the transmission line, the intrusion signal arriving at the receiver is the same irrespective of the location of the intrusion. This is a significant advantage of the present invention.

In a preferred form of the invention the radiating elements may be discrete antennas, such for example as dipole antennas, mounted to posts supporting a chain link fence. They can, of course, also be mounted to the side of a building or masonry wall and are loosely coupled to the common shielded transmission line. The radiation patterns of the dipole antennas are essentially spherical and project outwardly from the antenna and, of course, overlap with each other so that an intruder can only come to within the appropriate distance from the fence before interfering with the radiation field and thus providing an intrusion alarm signal. The antennas may be mounted at about the middle, or below, the supporting post of an ordinary fence so that radiation pattern extends to the ground and upwardly to the height of the fence in addition to overlapping from one side to the next.

In carrying out the invention in one form a perimeter intrusion detection system is provided comprising a transmitter for generating a wave signal to be propagated, an elongated propagating element connected at one end to the transmitter and defining at least a portion of the intrusion perimeter, the wave propagating element including means for radiating energy relative to the intrusion perimeter and for receiving radiated energy from the intrusion perimeter, and a receiver connected at the other end to the wave propagating element. According to a further form of the invention a doppler perimeter intrusion detection system is provided comprising a transmitter for generating a wave signal to be propagated, an elongated coaxial cable connected at one end to the transmitter for propagating the wave signal and defining at least a portion of the intrusion perimeter, a doppler receiver connected to the other end of the coaxial cable and a series of radiating and receiving discrete antennas uniformly spaced along and relatively loosely coupled to the coaxial cable, the antennas providing overlapping radiation patterns along the intrusion perimeter.

It is a further object of the invention to provide an improved perimeter intrusion detection system of the character indicated that is relatively low in cost, simple to install, and easy to maintain.

Further objects of the invention will be apparent as the description proceeds and it is intended to include all of the modifications coming within the scope of the subject disclosure and covered by the appended claims.

BRIEF DESCRIPTION OF THE DRAWINGS

FIG. 5 is a sectional view of a coaxial cable coupling unit utilized with the invention;

FIG. 6 is a sectional view taken substantially in the direction of the arrows 6—6 of FIG. 5;

FIG. 7 is a sectional view taken substantially in the direction of the arrows 7—7 of FIG. 6;

FIG. 8 is a detailed perspective view of one form of connector to the coaxial cable coupling unit; and FIG. 9 is a perspective exploded view of a modified form of coupling unit according to the invention.

DESCRIPTION OF THE PREFERRED EMBODIMENTS

Figures 1, 1A, 2, 3, 4:
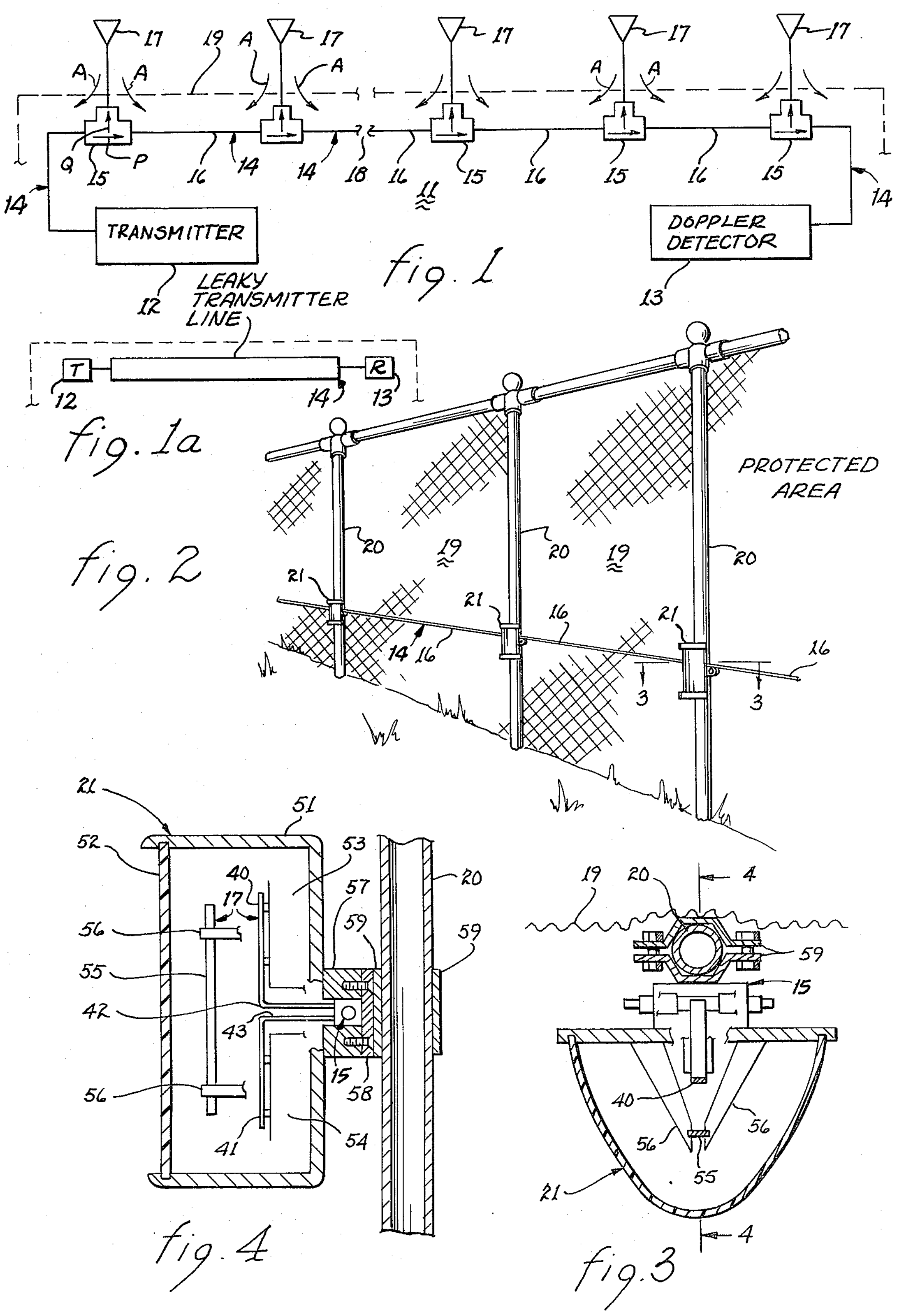
FIG. 1 is a diagrammatic view of an intrusion detection system, or a perimeter surveillance system, according to the invention.
FIG. 1*a* is a diagrammatic view similar to FIG. 1 of a particular form of the invention.
FIG. 2 is a perspective view showing installation of the system on an ordinary chain link fence.
FIG. 3 is a cross-sectional view of a radiating antenna taken substantially in the direction of lines 3—3 of FIG. 2.
FIG. 4 is a sectional view taken substantially in the direction of arrows 4—4 of FIG. 3.

Referring to the drawings there is shown in FIG. 1 an intrusion detection system 11 according to the invention, comprising a wave transmitter 12, a doppler detector, or receiver 13 interconnected by a transmission line 14, a series of couplers 15 interconnected uniform length sections 16 of the transmission line, and a series of radiating antennas 17 each one of which feeds from the transmission line through a respective one of the couplers 15. The transmission line 14 is shown broken at point 18 to indicate that the transmission line may be of varying length. Typically, the transmission line between transmitter 12 and receiver 13 may be about 100 meters in length and include 33 couplers and antennas uniformly spaced whereby each antenna would be disposed on the mounting pole of ordinary chain link fence. The transmitter 12 and the receiver 13 may be of any well known type made for operating at the frequencies desired.

The dotted line 19 diagrammatically shows the fence, or perimeter, to be protected.

FIG. 1 may profitably be considered in connection with FIG. 2 in which a typical chain link fence 19 is shown supported by steel posts 20 on each one of which is disposed an antenna assembly 21 to be more particularly described. Between each of the antenna assemblies 21 in FIG. 2 there may be seen a length, or section, 16 of coaxial cable, for example, one form of transmission line.

In FIG. 1*a* a system similar to that shown in FIG. 1 is illustrated wherein there is shown a leaky transmission line corresponding to the generalized transmission line 14 fed at one end by a transmitter 12 and terminated by a receiver 13 at the other end. The fence 19 is shown by the dotted line of that reference character. The leaky transmission line may be of any well-known variety.

The antenna assemblies 21 (FIG. 3), typically, may be mounted below the middle of a steel pole 20 which is to say about $2\frac{1}{2}$ feet from the ground on a pole six feet high.

As will become clear from subsequent description, the antenna assemblies 21 may include a dipole antenna which radiates an essentially spherical pattern extending outwardly from the particular post or antenna. The signal level is selected such that the radiation patterns of the antennas overlap each other and reach the ground as well as an area adjacent the top of the chain link fence, thereby providing a substantial perimeter of protection around the designated area.

As described, the antennas project a radiation pattern forwardly of the fence, but it will be evident that the radiation pattern may be reversed, that is to say point inwardly of the fence if that should be desired.

While discrete radiating elements are mounted to the post supporting the chain link fence, they can also be used against a side of a building or masonry wall and are loosely coupled to the common shielded transmission line, coaxial cable, as will become clear. Unshielded and leaky cable transmission lines have also been used, but have been proved very susceptible to false alarm due to naturally occurring environmental factors such as birds, wind moving the chain link fence, and rain impinging directly on the line. This environmental susceptibility is primarily due to the concentric cylindrical shape in the electro-magnetic field associated with the unshielded leaky cable.

The radiating elements preferably used in the subject invention are vertically polarized dipoles, as will become clear, subsequently, with parasitic elements that produce unidirectional patterns. The dipoles are oriented to have a pattern null facing the chain link fence, thus isolating the effects of fence movement from the detection field. It is also desirable to enclose the radiating element with an electrically transparent radome to prevent birds and rain from altering the antennas impedance which can appear as a false alarm. The resulting coverage pattern is a series of overlapping spherical patterns just inside the fence. The size of the spheres can be controlled by the threshold setting of the receiver. The spacing between dipoles is about ten feet, which is considered standard pole spacing for a chain link fence. Each section of coaxial cable 16 is attached at one end to one of the couplers 15, as may be seen in FIG. 5.

To assemble the coaxial cable into the system, a coupling unit 15 (FIG. 5) is attached to the base of an antenna assembly 21 as will be more fully explained, and the other end 16*a* of an adjoining section of a coaxial cable 16 is attached to the connecting collet 28 of a coupling unit 15. It will, of course, be understood that the end of the cable section 16*a* attached to the connecting collet 28 includes the center conductor 22, the dielectric layer 23, the foil sheath 24, the cable braid 25 and the cable insulating layer 26. A connector housing 29 receives interiorly the cable and the metal sheath 24. The braid 25 is received over the housing 29 and the cable is crimped thereto by crimping ferrule 27*a*. An appropriate connecting screw nut 29*a*, as is well understood in this art, is utilized to hold the end of cable section 16*a* to the collet 28.

Also, as will be more fully described subsequently in the specification, the transmission line, coaxial cable, 14 extending between the transmitter 12 and receiver 13 is completed by assembling the various sections 16 of coaxial cable together. As part of this process the coupling unit 15 is attached to one end of a section of cable 16 at the factory, for example, and the coupling unit 15 is attached to the base of an antenna assembly 21, also at the factory. Then, in the field where the intrusion detection system is to be installed, all the workman needs to do is to attach the antenna assembly including a coupling unit 15 to a fence post 20 and to screw the connecting nut 29*a* at cable end 16*a* to the connecting collet 28 of the coupling unit 15. When the desired number of cable section lengths 16 and coupling units (and antenna assemblies) are attached together and the transmitter and doppler detector connected the system is ready for functioning. When the coupling unit 15 is connected to the section of cable 16 at the factory, the center conductor 22 of the coaxial cable is inserted into a receiving slot in the center conductor end 31 of the coupling unit. When the other end 16*a* of a second section of cable 16 is connected to the connecting collet 28, the center conductor 22 of that section of cable is inserted into the corresponding slot in the center conductor end 32 of the coupling unit 15.

The antenna unit 21 will be more particularly described hereinafter, but the antenna 17 disposed interiorly thereof, in the preferred form of the invention, may comprise a dipole antenna consisting of two radiating elements 40 and 41 connected by means of a parallel plate transmission line 42, 43 to the coaxial cable 16 by means of the coupling unit 15. The antenna element 40 is coupled by means of transmission line element 42 to the center conductor of the coupling unit 15, as will be more particularly described, and the antenna element 41 is connected by means of transmission line element 43 to the outer, or ground, conductor of the coupling unit 15, also as will be more particularly described.

The operation of the system may be described as follows: The microwave energy from the transmitter 12 (oscillator) is coupled from the transmission line 14 (cable sections 16) to the antenna elements 17 (assemblies 21) of which there may be thirty-three in the system described. This generates a radiation field consisting of a series of spherical patterns along the length of the transmission line 14 specifically radiating from each of the antenna elements 17. The microwave energy that is not radiated from the antennas will appear at the mixer diode of the doppler receiver and will serve as a local oscillator signal as is well understood. A moving target in the radiation field near the transmission line (cable) will reflect some of the energy back into the line through the antenna element 17 but displaced in frequency by the well known doppler expression fd=2 V/λ wherein fd is equal to the doppler frequency, V is the velocity of the target and λ is the wave length transmitted, all in a consistent system of units.

The reflected signal is picked up by the particular antenna and is transmitted to the receiver where it is mixed with the local oscillator signal. The reflected signal is also transmitted toward the transmitter. However, this is small compared to the signal that is coupled directly towards the receiver. This is shown by the arrows A in FIG. 1. One of the mixed products will be the doppler frequency caused by the moving target. This signal is amplified and processed to determine if it meets a specific detection criteria which results in an alarm condition. A major advantage of this system is that sensitivity is constant for a fixed distance perpendicular to the cable. This is due to the receiver and the transmitter being placed at opposite ends of the transmission line or cable which results in equal attenuation paths for any target position at a constant distance from the line.

For the radiation pattern to be uniform and the sensitivity to be constant along the length of the cable it is essential that the energy coupled out of the coupling unit 15 to the antenna 17 be the same at each antenna and that the amount of energy coupled out of the cable at each antenna be optimized for best operation. Referring to FIG. 1, there is shown a series of arrows labeled P and Q which represent respectively the amount or percentage of signal passed through in series in each coupling unit and the percentage of the signal passed out of the coupling unit to the antenna 17. Q may be referred to as the coupling coefficient of each coupling unit to the connected antenna, while P may be considered the series coefficient. Of course there is attenuation in each length of cable 16 which will be considered subsequently in this specification.

Referring to FIG. 1, the system may be analyzed as follows: The signal from the transmitter 12 may be expressed as:

$$S_T = A\cos\omega_c t \quad (1)$$

wherein A is a constant representative of the amplitude of the signal at the transmitter, $\omega_c$ is equal to $2\pi f$ wherein f is the frequency of the signal and t is time.

Then the signal $S_R$ at the receiver, considering only doppler return signals from any single antenna is equal to:

$$S_R = A_1\cos\omega_c t + A_2\cos(\omega_c t + \omega_D)t \quad (2)$$

wherein $A_1$ and $A_2$ are amplitude constants respectively from equation (1) properly attenuated. Assuming that a square law detector is used at the receiver and considering only the doppler terms, equation (2) reduces to $S_D$ approximately equal to:

$$S_D = A_1A_2\cos\omega_D t \quad (3)$$

It will be evident that from considering FIG. 1 that $$A_1 = AP^N \quad (4)$$

wherein N is the number of antenna couplers. In this preliminary analysis the attenuation of the cable between couplers is ignored.

For the coefficient $A_2$, the attenuation is twice the loss to the antenna plus the series attenuation of the remaining couplers or:

$$A_2 = AQ^2P^{N-1} \quad (5)$$

which applies to any given single element regardless of its position.

The coefficient of the detected signal is then:

$$A_1A_2 = A^2Q^2P^{2N-1} \quad (6)$$

Upon the assumption that the power loss in the coupler is very small and is essentially zero, it can be shown that the coefficient $A_1$ $A_2$ is equal to:

$$A^2Q^2\,[1 - Q^2]\,\frac{2N-1}{2} \quad (7)$$

By the process of differentiation to find the maximum or optimum value of the coupling coefficient Q, it can be shown that:

$$Q = \sqrt{\frac{2}{2N-1}} \quad (8)$$

In all of the foregoing N is equal to the number of antenna couplers in any system, and it is evident that the coupling coefficient Q can be chosen to give the optimum coupling dependent upon the number of antennas in the system.

The optimization of the coupling attenuation Q has not considered the cable loss or the radar loss through the antennas. It can be seen when considering the circuit diagram of FIG. 1 that these additional losses will effect the equations (4) and (5) to give:

$$A_1 = AP^NP_c^N \quad (9)$$

and $$A_2 = AQ^2P^{N-1}Q_RP_c^N \quad (10)$$

where $P_c$ is the attenuation of the cable attached to each coupling unit and $Q_R$ is the attenuation calculated from the well-known radar equation. Equation (6) then becomes:

$$A_1A_2 = A^2Q^2P^{2N-1}Q_RP_c^{2N} \quad (11)$$

In considering equation (11) it is important to note that the cable loss is doubled when considering the detection response because the local oscillator signal and the doppler signal are effected. By graphical solutions, plotting curves, not shown, values of $A_1A_2$ can, of course, be determined for a particular system.

To obtain the value of Q, the coupling coefficient to the antennas, in each case the appropriate dimensions of the coupling units 15 are determined as will be described and understood.

The method of coupling the antennas to the transmission line, or cable, is a key factor in producing an economically viable intrusion detection system. In the typical system being described of about 100 meters in length of cable there would be one transmitter, one receiver, one hundred meters of coaxial cable and 33 radiating elements. These components must be of low cost and easy to install. The shielded cable used preferably is the type commonly used in the cable television industry and is less than three percent of the cost of commercial versions of slotted leaky coaxial cable.

An integral cable splice connector and bidirectional coupler 15 as shown in the drawings allows the installer to connect ten feet sections of cable together and to snap the connector coupler in place between two leaf springs that lead to the two driven elements of the dipole antenna.

The coupling unit 15 (referring to FIGS. 4, 5 and 6) may comprise a center conductor 30 having end portions 31 and 32 and a center portion 33, a surrounding dielectric member 34, an outer housing 35, the connecting collet 28 already referred to and a connecting extension 36, projecting from the opposite end of housing 35 to that of connecting collet 28. The connecting extension 36 has one end of the cable section 16 attached thereto as by the crimping ferrule 27, it being made certain that the foil sheath 24 is in good electrical contact with the interior of the connecting element 36 as by good crimping action.

As may be seen in FIG. 5 the dielectric member 34 is made of two parts for ease of assembly and the parts are held together by spin forming the edge of housing 35 onto the flange of collet 28.

In the construction of the coupling element 15 it is important that the impedances at each location within the coupling element be matched to the characteristic impedance of the cable 16, namely seventy-five ohms, in the particular case. Thus since the conducting end portion 31 of the central conductor 30, of necessity, is larger in diameter than the center conductor 22 of the cable 16, the diameter of that portion of the dielectric element 34 surrounding the conductor end 31 also is enlarged in diameter. This is to maintain the ratio between the outer diameter of the dielectric element 34 to the diameter of the conductor end 31 the same as the ratio of the outer diameter of the dielectric element 23 to the diameter of the center conductor 22.

The basic formula for determining the impedance in ohms of coaxial lines is $$Z = \frac{138}{\sqrt{e}} \log_{10} \frac{b}{a}$$

where b is the outer diameter of the dielectric element, a is the diameter of the central conductor, and e is the dielectric constant of the dielectric material. Since the central conductor end portion 32 is of the same diameter as the central conductor end portion 31 it follows that that portion of the dielectric material 34 at the leftmost end of the coupler is of the same diameter as that at the rightmost end of the coupler.

The outer housing 35 must be opened as shown at 37 to enable the antenna element 40 (44) to be attached to the dielectric element 34. The impedance at this location of the coupler is, accordingly, changed. Specifically, because conducting material is removed to provide for the opening 37, the impedance in the ground portion of the coupler is increased. To balance this increase in the impedance of the coupling unit the center portion 33 of the central conductor 30 is enlarged in diameter as shown. Referring to the formula defining the basic impedance for coaxial cables, it will be evident that this decreases the impedance and thus compensates for the increase in impedance brought about by the opening 37.

Since the opposite end of the cable section 16, namely 16*a*, is attached by means of a connector housing 29 and coupling nut 29*a* to the collet 28 and it is intended that this assembly be made for example by a workman in the field, the dielectric 23 of the cable end 16*a* terminates near the beginning of the collet 28 while the center conductor 22 extends further in and is received within the slot in the end of conductor end portion 32. For this reason it is evident that there will be an air space 38 surrounding that portion of the center conductor 32 within the bore of collet 28. For impedance matching to occur at this location of the coupling unit, reference may again be had to the formula defining the impedance of coaxial cables. Thus while the ratio of the diameter of the bore (the air space 38) within the collet 28 to the diameter of the conductor 32 is now different from that of the remaining sections of the coupling unit, the dielectric in the air space 38 is that of air and not that of the dielectric material 34. It being observed that the dielectric constant e appears in the denominator of the constant of the basic impedance formula, the impedance is therefor reduced, while that of the different diameters would cause it to be increased. These two factors can be chosen to compensate for each other in such a manner that the impedance in the area of the air space 38 is the 75 ohms of the cable sections.

The opening 37, of course, causes radiation of energy to take place from the central conductor 30 and particularly the section 33. This energy is taken out by means of the arcuate portion 44 which is the end part of the transmission line member 42, the latter continuing as the radiating element 40 of the dipole antenna. The outer housing 35 of the coupling unit includes a groove 45 into which is disposed a bent portion 46 which becomes part of the transmission line element 43 that continues as the grounded portion 41 of the dipole antenna.

The arcuate portion 44 is of the same diameter as the portion 47 of the dielectric element 34 at that section. The diameter 47 is selected in accordance with known teachings to give the desired degree of coupling between the arcuate portion 44 and the connected antenna element 40 and the optimum coupling Q between the coupling unit and the radiating antenna. It will be clear that if the diameter of the portion 47 remains the same as the diameter of the remaining portion of the dielectric element 34 there will be one degree of coupling to the central conducting section 33 as compared with a condition, for example, that would exist if the arcuate element 44 were connected directly to the central conductor portion 33.

Referring to FIG. 8, the arcuate portion 44 of the transmission line element 42 is divided into two parts 48 and 49 or is bifurcated. This is an artifice that may be used to decrease the degree of coupling between the arcuate element 44 and the central conducting portion 33.

It is important in utilizing the coupling units 15 that there be good contact to the center conductor 22 of the connecting cable and also to the metallic sheath 24 surrounding the dielectric element 23. For this reason the metallic foil sheath 24 is brought internally of the connecting extension 36 of the coupling housing and likewise is brought internally of the connector housing 29.

The antenna unit 21 comprises a housing 51 which may be of any suitable insulating material such as, for example, plastics, a cover 52 of synthetic material for example, the dipole antenna elements 40 and 41 supported upon upstanding supports 53 and 54 as by screws, for example, and a director element 55 disposed upon insulating supports 56. The spacing between the director element 55 and the elements 40 and 41 of the dipole antenna is essentially one-quarter wave length at the frequency being utilized.

Extending, respectively, from the dipole elements 40 and 41 are the parallel plate transmission line elements 42 and 43 which connect with the coupling unit 15 as already described.

The impedance of the dipole antenna 40, 41 is made essentially seventy-five ohms in order to match the impedances throughout the system. The impedance of the antenna is matched to that of the coupling unit and as well to the cable sections 16 by the connecting transmission line 42, 43 which is constructed as a parallel plate line section whose impedance in ohms is determined basically by the formula $Z=377\ W/L$ where W is the spacing between the plates or elements 42 and 43 and L is the width of these plates. Thus, the spacing between elements 42 and 43 and their width is chosen such that their ratio multiplied by 377 is equal to 75 ohms. Accordingly, the impedances are matched throughout the system.

In a preferable form of the invention the antenna unit 21 is assembled to the coupling unit 15 at the place of manufacture as, for example, by a base 57 to which the coupling unit 15 may be held as by a plate 58 and screws, as seen best in FIG. 4. Then in the field where the unit is assembled for use, the assembled antenna unit is attached to a fence post 20, for example, by bolting together two halves of a clamp 59 as may be seen best in FIG. 3. Any other form of attachment, of course, may be used.

The parallel plate transmission line 42, 43 is ideal for use in the preferred form of the invention inasmuch as the normal ends of these two elements lend themselves to the formation of an attaching unit for coupling to the dielectric element 34 on the one hand and to the metallic housing 35 on the other. At the same time the other ends of the parallel plate antenna elements 42, 43 are bent into the dipole elements 40, 41.

The director element 55 is spaced in front of the antenna elements 40, 41 by a quarter wave length in order to direct the radiation pattern outwardly from the antenna in the desired pattern to provide a null at the fence post and the associated fence to prevent motions of the fence, etc. from causing variations in the radiation pattern. The mounting of the antenna elements 40, 41 to the fence post may also be such that the pole 20 acts as a reflector in order to assist in the formation of the desired directive pattern of the antenna.

Disposing the radome type cover 52 in front of the antenna 41 allows the antenna to maintain its directive pattern and prevents impedance changes during conditions of rain or other weather conditions. It also avoids any false alarming due to the presence of birds perched adjacent to the antenna.

Referring to FIG. 9, there is shown a modified form of the invention in which the coupler 60 could be a separate unit or could in effect be an opening disposed in the coaxial cable itself. Thus there is shown in this Figure a coaxial cable 61 comprising a central conductor 62, an insulating or dielectric layer 63 and an outer or metallic sheath 64.

The outer sheath 64 has an opening 65 cut thereinto to expose the dielectric layer 63 which may be reduced in cross section within the opening 65 as shown by the reference character 63*a* in accordance with the foregoing description in order to achieve the desired degree of coupling between the dipole antenna elements and the coaxial cable. Thus the dipole antenna may comprise two parallel plate elements 66 and 67, the plate 66 having an arcuate portion 68 at one end for connection to the dielectric layer 63*a* and the antenna element 67 has an arcuate portion 69 for engagement around the outer metallic sheath or layer 64. For improved contact with the arcuate portion 68, the reduced dielectric layer 63*a* may be surrounded by a metallic film, as layer 63*b*.

It will be recognized that an inexpensive form of intrusion detection system has been disclosed. While in FIG. 1, diagrammatically, one transmitter and one receiver have been shown together with a series of antennas 17, it will be understood that more than one of such systems may be utilized to define a total perimeter. Best results have been achieved when the length of coaxial cable between transmitter 12 and the receiver 13 is about 100 meters. Thus to define a larger perimeter a series of combinations of transmitters, receivers and coaxial cables may of course be utilized. Systems according to the invention are utilizable within the frequency ranges authorized by the federal communications commission for intrusion equipment, such frequencies include 915 mega-hertz 2.4 giga-hertz, 10.5 giga-hertz and 24.125 giga-hertz.

While preferred embodiments of the invention have been disclosed it will be understood that other forms may be devised within the spirit and scope of the disclosure. It is intended by the accompanying claims to cover all such forms.

I claim:

1. A perimeter intrusion detection system comprising a transmitter for generating a wave signal to be propagated, an elongated wave propagating element connected at one end to said transmitter and defining at least a portion of the intrusion perimeter, said wave propagating element including means for radiating energy relative to said intrusion perimeter and for receiving radiated energy from said intrusion perimeter, and a receiver connected at the other end to the wave propagating element.

2. The perimeter intrusion detection system according to claim 1 wherein said receiver is a doppler receiver and said means for radiating energy and receiving radiated energy comprises a leaky transmission line.

3. The perimeter intrusion detection system according to claim 1 wherein said elongated wave propagating element comprises a coaxial cable and said means for radiating energy and receiving radiated energy comprises a discrete antenna coupled to said coaxial cable.

4. The perimeter intrusion detection system according to claim 3 wherein said receiver is a doppler receiver and said discrete antenna comprises a dipole antenna relatively loosely coupled to said coaxial cable.

5. A doppler perimeter intrusion detection system comprising a transmitter for generating a wave signal to be propagated, an elongated coaxial cable connected at one end to said transmitter for propagating said wave signal and defining at least a portion of the intrusion perimeter, a doppler receiver connected to the other end of said coaxial cable and a series of radiating and receiving discrete antennas spaced along and relatively loosely coupled to said coaxial cable, said antennas providing overlapping radiation patterns along the intrusion perimeter.

6. The doppler perimeter intrusion detection system according to claim 5 wherein said elongated coaxial cable comprises a series of lengths of coaxial cable and a series of coupling units each of which connects adjacent lengths of said coaxial cable, one of said discrete antennas being coupled to each one of said coupling units.

7. The doppler perimeter intrusion detection system according to claim 6 wherein the degree of coupling between the coaxial cable and each of the antennas is selected for maximum doppler signal at said receiver and relative to the number of antennas.

8. The doppler perimeter intrusion detection system according to claim 6 wherein the impedance within each coupling unit is maintained at the characteristic impedance of the coaxial cable.

9. The doppler perimeter intrusion detection system according to claim 8 wherein the impedance between each coupling unit and its connected antenna is matched to the characteristic impedance of the coaxial cable.

10. A method for detecting intrusions of a perimeter comprising the steps of providing a transmission line along said perimeter with a transmitter at one end and a receiver at the other end, providing radiation transmitting and detecting elements uniformly coupled to said transmission line and providing approximately equal detection sensitivity for like-sized intruders at equal distances perpendicular to said transmission lines.

* * * * *